United States Patent
Park et al.

(10) Patent No.: US 11,987,861 B2
(45) Date of Patent: May 21, 2024

(54) METHOD FOR RECOVERING VALUABLE METAL FROM WASTE ELECTRODE MATERIAL OF LITHIUM SECONDARY BATTERY BY USING LITHIUM CARBONATE

(71) Applicant: ECOPRO INNOVATION CO., LTD., Chungcheongbuk-do (KR)

(72) Inventors: Suk Joon Park, Gyeongsangbuk-do (KR); Myung Gyu Lee, Gyeonggi-do (KR); Jeong Sik Hong, Chungcheongbuk-do (KR); So Yeong Byun, Chungcheongbuk-do (KR); Gwang Seok Lee, Gyeongsangbuk-do (KR); Jong Sun Park, Chungcheongbuk-do (KR); Beom Seok Seo, Gyeongsangbuk-do (KR); Min Woo Lee, Chungcheongbuk-do (KR); Da Mo A Kim, Chungcheongbuk-do (KR); Hui Sang Kim, Gyeongsangbuk-do (KR); A Ram Park, Chungcheongbuk-do (KR)

(73) Assignee: ECOPRO INNOVATION CO., LTD., Chungcheongbuk-Do (KR)

( * ) Notice: Subject to any disclaimer, the term of this patent is extended or adjusted under 35 U.S.C. 154(b) by 0 days.

(21) Appl. No.: 17/922,644

(22) PCT Filed: May 21, 2021

(86) PCT No.: PCT/KR2021/006364
§ 371 (c)(1),
(2) Date: Nov. 1, 2022

(87) PCT Pub. No.: WO2021/241944
PCT Pub. Date: Dec. 2, 2021

(65) Prior Publication Data
US 2023/0160036 A1 May 25, 2023

(30) Foreign Application Priority Data
May 26, 2020 (KR) .................. 10-2020-0063069

(51) Int. Cl.
*C22B 3/00* (2006.01)
*C01G 51/06* (2006.01)
(Continued)

(52) U.S. Cl.
CPC ............ *C22B 23/043* (2013.01); *C01G 51/06* (2013.01); *C01G 53/06* (2013.01); *C22B 1/005* (2013.01);
(Continued)

(58) Field of Classification Search
CPC ......... C22B 23/043; C22B 1/005; C22B 3/08; C22B 7/007; C22B 23/0453; C22B 26/12;
(Continued)

(56) References Cited

U.S. PATENT DOCUMENTS 10,308,523 B1  6/2019  Chow et al.
2018/0155208 A1  6/2018  Chow et al.

FOREIGN PATENT DOCUMENTS

CN  108767353 A  11/2018
CN  110668506 A  * 1/2020
(Continued)

OTHER PUBLICATIONS

CN-111115662-A Translation (Year: 2020).*
(Continued)

*Primary Examiner* — Brian D Walck
*Assistant Examiner* — Danielle Carda
(74) *Attorney, Agent, or Firm* — The PL Law Group, PLLC

(57) ABSTRACT

A method according to an embodiment is for recovering a valuable metal from a waste electrode material of a lithium
(Continued)

secondary battery by using lithium carbonate. An anode-cathode mixed electrode material that has been separated by draining, crushing, screening, and sorting a waste lithium secondary battery is preprocessed. A precipitation operation performed by adding lithium carbonate ($Li_2CO_3$) to a metal melt acquired by performing sulfuric acid dissolution using sulfuric acid. A valuable metal such as nickel, cobalt, manganese, aluminum, and copper is recovered as a residue in the form of a carbonate composite, and a lithium sulfate ($Li_2SO_4$) aqueous solution including lithium is recovered as a filtrate.

7 Claims, 1 Drawing Sheet

(51) Int. Cl.
*C01G 53/06* (2006.01)
*C22B 1/00* (2006.01)
*C22B 3/08* (2006.01)
*C22B 7/00* (2006.01)
*C22B 26/12* (2006.01)
*H01M 10/54* (2006.01)

(52) U.S. Cl.
CPC ............... *C22B 3/08* (2013.01); *C22B 7/007* (2013.01); *C22B 23/0453* (2013.01); *C22B 26/12* (2013.01); *H01M 10/54* (2013.01)

(58) Field of Classification Search
CPC ......... C22B 7/001; C22B 7/005; C22B 7/006; C22B 23/0461; C01G 51/06; C01G 53/06; C01G 3/00; C01G 45/00; H01M 10/54; H01M 4/525; H01M 10/052; C01F 7/77; C01P 2006/80; C01D 15/06; Y02E 60/10; Y02P 10/20; Y02W 30/84; Y02W 30/50

USPC .......................................................... 75/739
See application file for complete search history.

(56) References Cited

FOREIGN PATENT DOCUMENTS

| CN | 111115662 A | * | 5/2020 | ............. C01D 15/02 |
|---|---|---|---|---|
| JP | 2004-214025 A | | 7/2004 | |
| JP | 2007-122885 A | | 5/2007 | |
| KR | 10-2012-0094619 A | | 8/2012 | |
| KR | 10-2015-0086143 A | | 7/2015 | |

OTHER PUBLICATIONS

CN-110668506-A Translation (Year: 2020).*
Office action dated Oct. 26, 2020 from Korean Patent Office in a counterpart Korean Patent Application No. 10-2020-0063069 (English translation is also submitted herewith.).
Notice of Allowance dated Nov. 13, 2020 from Korean Patent Office in a counterpart Korean Patent Application No. 10-2020-0063069(all the cited references are listed in this IDS.) (English translation is also submitted herewith.).
International Search Report for PCT/KR2021/006364 dated Sep. 6, 2021.
European Search Report For EP 21812247.1 issued on Jan. 24, 2024 from European patent office in a counterpart European patent application.
Elena Mossali et al., "Lithium-ion batteries towards circular economy: A literature review of opportunities and issues of recycling treatments", Journal of Environmental Management, 2020, vol. 264, DOI: 10.1016/J.JENVMAN.2020.110500

* cited by examiner

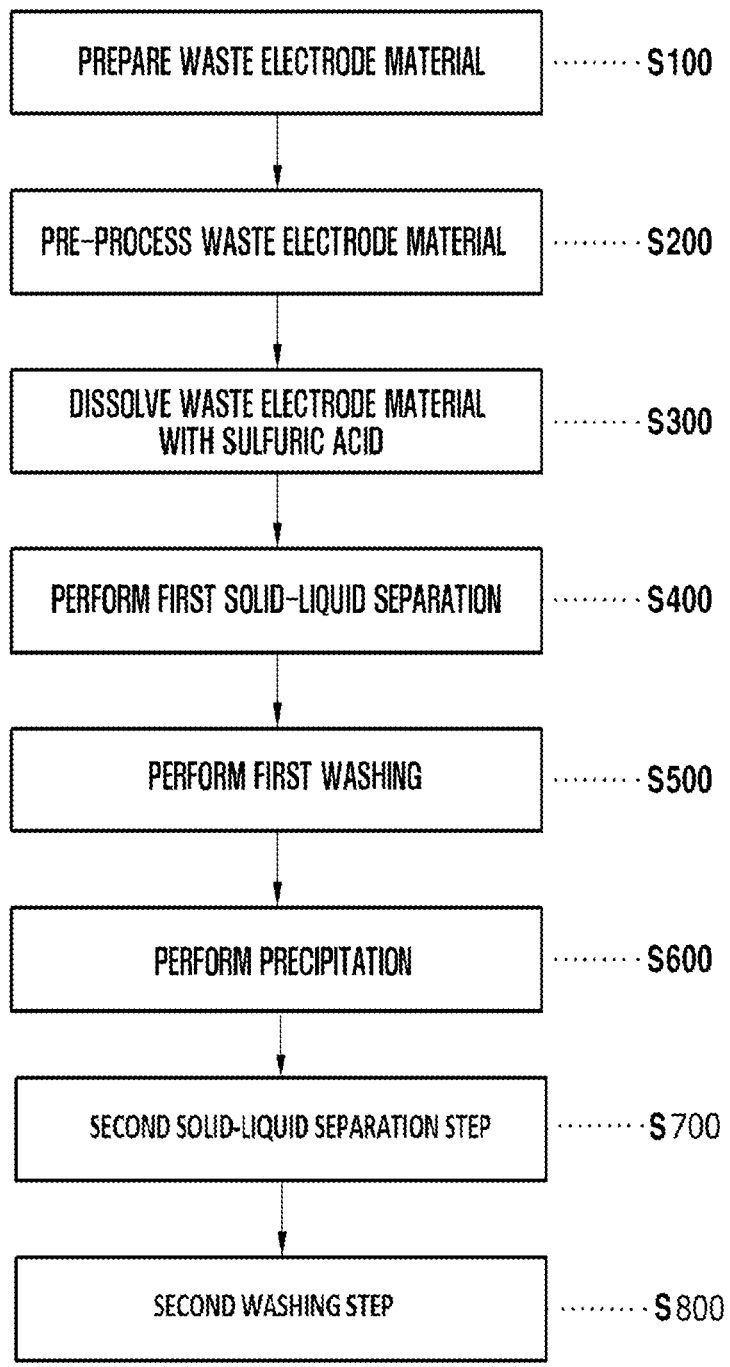

METHOD FOR RECOVERING VALUABLE METAL FROM WASTE ELECTRODE MATERIAL OF LITHIUM SECONDARY BATTERY BY USING LITHIUM CARBONATE

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/006364, filed May 21, 2021, which claims priority to the benefit of Korean Patent Application No. 10-2020-0063069 filed in the Korean Intellectual Property Office on May 26, 2020, the entire contents of which are incorporated herein by reference.

BACKGROUND

1. Technical Field

The present invention relates to a method for recovering valuable metals. More specifically, the present invention relates to a method of recovering valuable metals from a waste electrode material of a lithium secondary battery by using lithium carbonate. With the method, it is possible to easily recover valuable metals such as lithium, nickel, cobalt, manganese, aluminum, and copper from an anode-cathode mixed electrode material obtained from waste lithium secondary batteries as a raw material by discharging, crushing, screening, and classifying the waste lithium secondary batteries.

2. Background Art

As fossil fuels are pointed out as the cause of global warming and environmental pollution around the world, countries are implementing policies to promote the use of electric vehicles.

For this reason, the global supply of electric vehicles is expected to increase 25 times from 510,000 units in 2016 to 12.06 million units in 2030.

However, in the case of lithium secondary batteries mounted on electric vehicles, the amount of disposal after the expiration of the service period is also increasing along with the increase in usage.

Globally, the majority of waste lithium secondary batteries were small batteries used for IT devices, and about 200,000 tons were generated in 2018. In 2025, it is expected that a large amount of waste lithium secondary batteries for electric vehicles and electric buses will be generated, and the amount is expected to become about 700,000 tons.

Valuable metals such as about 17 kg of lithium, about 79 kg of nickel, and about 41 kg of cobalt are contained in one ton of waste lithium secondary batteries. In a current situation where it is difficult to gain price competitiveness, the recovery of these metals, which are mostly imported, can be a significant advantage in securing raw materials through recycling of waste resources.

An existing valuable metal recovery method to recycle waste batteries recovers and recycles valuable metals such as nickel and cobalt through sulfuric acid dissolution and solvent extraction processes, but in the case of lithium, the existing method recovers only a small amount of lithium at a low recovery rate and purity in the last stage of the recovery processes or does not recover lithium at all. Thus, lithium is discarded as dissolved in wastewater.

Accordingly, in the case of lithium, which is an essential element for the manufacture of a lithium secondary battery, the development of efficient recycling technology for recovering lithium is required in terms of the efficient use of resources and economy.

SUMMARY

The present invention has been made in view of this need. An objective of the present invention is to provide a method of recovering valuable metals by using lithium carbonate from waste electrode materials of waste lithium secondary batteries, the method being capable of easily recovering valuable metals such as lithium, nickel, cobalt, manganese, aluminum, copper, etc. from the waste electrode materials of the lithium secondary batteries.

The objectives of the present disclosure are not limited to the ones described above, and other objectives will be clearly understood by those skilled in the art from the following description.

In order to accomplish the objective of the present invention, there is provided a method of recovering valuable metals from waste electrode materials, the method including: a waste electrode material preparation step of preparing a waste electrode material; a pre-processing step of introducing the waste electrode material into a firing furnace and thermally treating the waste electrode material in the firing furnace; a sulfuric acid dissolution step of adding sulfuric acid to the resulting pre-processed product to cause a reaction; a first solid-liquid separation step of separating the resulting reaction products produced through the sulfuric acid dissolution step into a metal melt and an unreacted residue; a precipitation step of mixing lithium carbonate ($Li_2CO_3$) with the metal melt and stirring the mixture; and a second solid-liquid separation step of separating the precipitation result generated through the precipitation step into a precipitation residue and a filtrate. The method recovers an aqueous solution of lithium sulfate from the filtrate and recovers nickel carbonate and cobalt carbonate from the precipitation residue.

In a preferred embodiment, the pre-processing step may be performed at a temperature of 300° C. to 500° C. for a duration of 30 minutes to 120 minutes.

In a preferred embodiment, in the sulfuric acid dissolution step, the reaction may be performed by stirring at a temperature in a range of 60° C. to 100° C. for a duration of 60 minutes to 120 minutes at a speed of 250 rpm to 400 rpm.

In a preferred embodiment, the sulfuric acid dissolution step may further include adding hydrogen peroxide to the pre-processed product.

In a preferred embodiment, in the method, a first washing step of washing the unreacted residue with water may be further performed after the first solid-liquid separation step, and the precipitation step may be performed by mixing the lithium carbonate with a mixed solution containing a washing solution and the metal melt and stirring the mixture.

In a preferred embodiment, in the precipitation step, the reaction may be performed by stirring at a temperature of 40° C. to 80° C. for a duration of 60 minutes to 180 minutes at a speed of 250 rpm to 400 rpm.

In a preferred embodiment, in the method, a second washing step of washing the precipitation residue with water may be further performed after the second solid-liquid separation step, and an aqueous solution of lithium sulfate may be recovered from a washing solution obtained through the second washing step.

The present invention has the advantages described below.

In the method of recovering valuable metals from waste electrode materials of lithium secondary batteries by using lithium carbonate, the following steps are performed: the lithium secondary batteries are discharged, crushed, sorted, and classified to obtain an anode-cathode mixed electrode material; the anode-cathode mixed electrode material is pre-processed; the pre-processed product is dissolved in sulfuric acid to obtain a metal melt; the metal melt is precipitated by using lithium carbonate ($Li_2CO_3$); valuable metals such as nickel, cobalt, manganese, aluminum, and copper are easily recovered from the precipitate; and an aqueous solution of lithium sulfate ($Li_2SO_4$) containing lithium is easily recovered from the filtrate.

In addition, with the use of the method of recovering valuable metals by using lithium carbonate from waste electrode materials of lithium secondary batteries, it is possible to recover valuable metals such as lithium, nickel, cobalt, manganese, aluminum, and copper from the waste electrode materials of the waste lithium secondary batteries with a high recovery rate and high purity.

In addition, with the use of the method of recovering valuable metals, by using lithium carbonate, from a waste electrode material of a lithium secondary battery, according to the present invention, a recovered lithium sulfate aqueous solution can be prepared as lithium hydroxide monohydrate through lithium hydroxide conversion and concentration crystallization processes, and a carbonate composite recovered as a residue has the advantage of being used as a raw material for preparing a precursor.

BRIEF DESCRIPTION OF THE DRAWING

FIGURE is a diagram illustrating a method of recovering valuable metals by using lithium carbonate from a waste electrode material of a lithium secondary battery, according to one embodiment of the present invention.

DETAILED DESCRIPTION

As the terms used to describe the present disclosure in the present disclosure, as many general terms as possible are selected. However, in certain cases, terms that are chosen by the inventors of the present disclosure may be used. In such cases, the meanings of the terms should be understood not simply by the name but by the detailed description of the invention.

Hereinafter, the technical aspects of the present disclosure will be described in detail with reference to the preferred embodiments illustrated in the accompanying drawings.

However, the present invention is not limited to the embodiments described herein and may be embodied in other forms. Like reference numerals refer to like elements throughout the description herein and the drawings.

The term "equivalent" described herein refers to a chemical equivalent which is the amount of a substance that directly or indirectly combines with a hydrogen atomic weight of 1 or an oxygen atomic weight of 8.

FIGURE is a diagram illustrating a method of recovering valuable metals by using lithium carbonate from a waste electrode material of a lithium secondary battery, according to one embodiment of the present invention.

Referring to FIGURE, according to one embodiment of the present invention, a method of recovering valuable metals, by using lithium carbonate, from a waste electrode material of a lithium secondary battery is a method of recovering a valuable metal from a waste electrode material of a lithium secondary battery. First, a waste electrode material preparation step S100 of preparing a waste electrode material is performed.

Here, the waste electrode material may be an anode-cathode (anode-anode active material and cathode-cathode active material) mixed electrode material obtained by discharging, crushing, screening, and classifying waste lithium secondary batteries to be disposed of or may be a waste cathode material that is poorly processed or unsuitable for use and is generated in a cathode material production process.

The waste electrode material includes at least one selected from lithium nickel cobalt aluminum oxide ($LiNiCoAlO_2$, NCA), lithium nickel cobalt manganese oxide ($LiNiCoMnO_2$, NCM), lithium iron oxide ($LiFePO_4$, LFP), lithium manganese iron oxide ($LiMnFePO_4$, LMFP), lithium manganese oxide ($LiMn_2O_4$, LMO), lithium nickel manganese spinel ($LiNi_{0.5}Mn_{1.5}O_4$, LNMO), and lithium cobalt oxide ($LiCoO_2$, LCO).

Next, a preprocessing step S200 in which the prepared waste electrode material is fired in a firing furnace is performed to thermally treat the prepared waste electrode material.

The pre-processing step S200 is a process for removing an organic binder contained in the waste electrode material. Preferably, the pre-processing step S200 is performed in an air atmosphere at a temperature of 300° C. to 500° C. for a duration of 30 minutes to 120 minutes to remove the organic binder.

Therefore, moisture and organic binders present in the waste electrode material are removed, and the resulting pre-processed waste electrode material contains a cathode active material and a carbon material as an anode active material.

When the pre-processing step S200 is performed at a temperature higher than 500° C., the carbon material can be removed as well as the organic binder. However, in this case, the cost of the firing process is increased. In addition, such a high pre-processing temperature is not desirable in terms of recycling of the carbon material separated in a sulfuric acid dissolution step S300 described below. Therefore, preferably, the pre-processing step S200 may be performed in a temperature range of 300° C. to 500° C.

Next, the sulfuric acid dissolution step S300 is performed in which sulfuric acid is added to the pre-processed waste electrode material produced through the pre-processing step S200. In this step, the pre-processed waste electrode material reacts with the sulfuric acid.

The sulfuric acid dissolution step S300 is a process for leaching valuable metals contained in the pre-processed product. In this step, the reaction may be performed with stirring at a temperature of 60° C. to 100° C. for a duration of 60 minutes to 120 minutes at a speed of 250 rpm to 400 rpm.

In addition, in the sulfuric acid dissolution step S300, sulfuric acid with a purity of 98% may be used, and 0.94 to 1.0 equivalent of the sulfuric acid relative to Li, Ni, Co, Mn, Al and Cu contained in the pre-processed product may be used.

In this case, it is preferable that the solid to liquid ratio of the pre-processed product and the mixture containing the sulfuric acid and water is 300 g/L or more.

In addition, in the sulfuric acid dissolution step S300, while the sulfuric acid is added to the pre-processed product and stirred, hydrogen peroxide may be further added thereto.

In this case, the hydrogen peroxide may have a purity in a range of 30% to 32%, and the amount of hydrogen peroxide that is added may be in a range of 0.5 mole to 0.55 mole relative to the number of moles of Ni, Co, and Mn contained in the pre-processed product.

In the sulfuric acid dissolution step S300, the reason for performing the reduction leaching using hydrogen peroxide is that cobalt contained in the pre-processed product is present as $Co^{3+}$, which causes a low leaching rate. Therefore, in the sulfuric acid dissolution step S300, hydrogen peroxide is added for the reduction of $Co^{3+}$ to $Co^{2+}$. This reduction leaching process can also increase the leaching rate of lithium as well as the leaching rate of cobalt.

That is, through the sulfuric acid dissolution step S300, a sulfuric acid solution containing valuable metals such as $Li_2SO_4$, $NiSO_4$, $CoSO_4$, $MnSO_4$, $Al_2(SO_4)_3$, and $CuSO_4$ may be obtained.

Next, a first solid-liquid separation step S400 of separating the dissolved materials in the sulfuric acid solution produced through the sulfuric acid dissolution step S300 into a metal melt and an unreacted residue is performed.

In the first solid-liquid separation step S400, since the valuable metals leached through the sulfuric acid dissolution step S300 are present in a mixed phase with the unreacted carbon material, the solid-liquid separation is performed.

Next, a first washing step S500 in which the unreacted residue obtained through the first solid-liquid separation step S400 is washed with water is further performed.

The first washing step S500 is performed to further recover the metal ions present in the unreacted residue wet with water. Water having a temperature in a range of room temperature and 50° C. is added to obtain a washing solution resulting from the washing of the unreacted residue.

Next, a precipitation step S600 is performed in which lithium carbonate ($Li_2CO_3$) is mixed with the metal melt obtained through the first solid-liquid separation step S400 and stirred.

In addition, when the first washing step S500 is further performed in the precipitation step S600, the lithium carbonate may be mixed with a mixed solution of the metal melt obtained through the first solid-liquid separation step S400 the washing solution obtained through the first washing step S500 and may be stirred.

Here, valuable metals such as $Li_2SO_4$, $NiSO_4$, $CoSO_4$, $MnSO_4$, $Al_2(SO_4)_3$, and $CuSO_4$ are dissolved in the metal melt and the washing solution. Among these, to selectively separate lithium and recover other valuable metals in the form of a carbonate composite, lithium carbonate is added and stirred to cause a precipitation reaction.

In addition, in the precipitation step S600, the stirring is performed at a temperature of 40° C. to 80° C. for a duration of 60 minutes to 180 minutes at a speed of 250 rpm to 400 rpm.

In addition, in the precipitation step S600, the amount of lithium carbonate used is preferably adjusted to minimize the loss of lithium that is finally recovered through the precipitation and separation of metals.

This is because when the amount of lithium carbonate added is increased, the precipitation rates of metal ions such as Ni, Co, Mn, Al, and Cu present in the solution are increased, but the overall lithium recovery rate may be reduced due to the presence of unreacted lithium carbonate remaining in the residue.

In the precipitation step S600, metals such as Ni, Co, Mn, Al, and Cu are precipitated in the form of a carbonate composite due to the reaction between the metal ions in the sulfuric acid solution and the lithium carbonate, and lithium is present in the solution in the form of lithium sulfate ($Li_2SO_4$).

In addition, in the precipitation step S600, the reaction formulae of lithium carbonate precipitation of major valuable metals are shown below (See Reaction Formulae 1 to 5).

$NiSO_4+Li_2CO_3=NiCO_3+Li_2SO_4$ (Reaction Formula 1)

$CoSO_4+Li2CO_3=CoCO_3+Li_2SO_4$ (Reaction Formula 2)

$MnSO_4+Li_2CO_3=MnCO_3+Li_2SO_4$ (Reaction Formula 3)

$Al_2(SO_4)_3+3Li_2CO_3=Al_2(CO_3)_3+3Li_2SO_4$ (Reaction Formula 4)

$CuSO_4+Li_2CO_3=CuCO_3+Li_2SO_4$ (Reaction Formula 5)

Next, a second solid-liquid separation step S700 of separating the precipitation result generated through the precipitation step S600 into a precipitate and a filtrate is performed.

Through the second solid-liquid separation step S700, lithium sulfate ($Li_2SO_4$) containing lithium is separated as the filtrate, and the remaining useful metals are recovered in the form of a carbonate composite, i.e., the precipitate.

That is, in the second solid-liquid separation step S700, an aqueous solution of lithium sulfate is recovered from the filtrate, and nickel carbonate and cobalt carbonate are recovered from the precipitate.

Next, a second washing step S800 in which the precipitate obtained through the second solid-liquid separation step S700 is washed with water is further performed.

The percentage of water content in the precipitate is about 40% or more, and the precipitate contains a considerably large amount of lithium sulfate ions. The precipitate may be washed with washing water to recover an aqueous solution of lithium sulfate.

Example 1

In order to remove an organic binder and trace moisture present in a waste electrode material of a waste lithium secondary battery, 100 g of the waste electrode material was fired in a firing furnace at 350° C. for 60 minutes, and finally, 83.5 g of the pre-processed product was obtained.

The waste electrode material pre-processed by firing was subjected to metal leaching that is performed at a reaction temperature of 80° C. and a stirring speed of 300 rpm. When the solid-liquid concentration was 33 g/L, 18.4 mL of sulfuric acid (98% concentration) and 81.6 mL of water were added to 33 g of the electrode material.

The sulfuric acid was added as much as 1.0 equivalent to Li, Ni, Co, Mn, Al, Cu of the waste electrode material, and then 10 mL of hydrogen peroxide (30% concentration) was additionally added for reduction leaching.

Most of the metals were leached within an hour after the addition of hydrogen peroxide. Since hydrogen peroxide comes into contact with sulfuric acid, a sudden exothermic reaction occurs. Therefore, the rate of addition of hydrogen peroxide was regulated, and oxygen ($O_2$) generated as a byproduct was discharged.

The filtrate was recovered through solid-liquid separation after dissolving the waste electrode material in sulfuric acid, and the residue was washed with water.

The filtrate of the leachate recovered through the sulfuric acid dissolution from the waste electrode material was mixed with the washing solution recovered through the residue washing, and the mixture of the filtrate of the leachate and the washing solution was reacted with lithium carbonate (purity: 98% to 99%) to obtain a precipitate.

The precipitation products were separated through solid-liquid separation. After washing the precipitate with water, the washing solution was obtained.

An aqueous solution of high purity lithium sulfate was then recovered from the washing solution and the filtrate, and a metal carbonate composite including nickel carbonate, cobalt carbonate, etc. was selectively recovered from the precipitate that was washed.

Experiment Example 1: Composition Analysis of Pre-Processed Product

Composition analysis of the pre-processed product of the waste electrode material obtained in Example 1 was performed, and the results are shown in Table 1.

TABLE 1

| Elements | Li (%) | Ni (%) | Co (%) | Mn (%) | Al (%) | Cu (%) |
|---|---|---|---|---|---|---|
| Content | 4.02 | 11.68 | 10.0 | 9.52 | 2.86 | 2.05 |

As shown in Table 1, it was confirmed that the pre-processed product contained lithium in an amount of 4.02%, nickel in an amount of 11.68%, cobalt in an amount of 10.00%, manganese in an amount of 8.52%, aluminum in an amount of 2.86%, and copper in an amount of 2.05%.

Experiment Example 2: Metal Leaching Rate of Waste Electrode Material

Using the mixture of the washing solution obtained through the first washing step of Example 1 and the metal melt, the metal leaching rate was determined. The results are shown in Table 2 below.

TABLE 2

| Li leaching rate (%) | Ni leaching rate (%) | Co leaching rate (%) | Mn leaching rate (%) | Al leaching rate (%) | Cu leaching rate (%) |
|---|---|---|---|---|---|
| 99.8 | 99.7 | 99.6 | 99.7 | 99.1 | 99.8 |

As shown in Table 2, through the sulfuric acid dissolution step, 99% or more of the valuable metals present in the waste electrode material were leached.

Experiment Example 3: Lithium Recovery Rate According to Precipitation Reaction Time and Temperature 8.0% by weight of lithium carbonate was added to the mixture of the filtrate of the leachate and the washing solution of Example 1, and a precipitation reaction was carried out at 60° C. for 1 to 3 hours. Next, the reaction products underwent solid-liquid separation, so that the filtrate and the precipitate were recovered. The recovery rate of each valuable metal is shown in Table 3 below.

In addition, 8.0% by weight of lithium carbonate was added to the mixture of the filtrate of the leachate and the washing solution, a precipitation reaction was carried in a reaction temperature range of 25° C. to 60° C. for 1 hour. Next, the filtrate and the precipitate were recovered through solid-liquid separation. The recovery rate of each valuable metal is shown in Table 3 below.

TABLE 3

| Classification | | Li recovery rate (%) | Ni recovery rate (%) | Co recovery rate (%) | Mn recovery rate (%) | Al recovery rate (%) | Cu recovery rate (%) |
|---|---|---|---|---|---|---|---|
| Reaction time (temperature 60° C.) | 1 hr | 96.4 | 99.9 | 99.9 | 99.8 | 99.9 | 99.9 |
| | 2 hr | 96.6 | 99.9 | 99.9 | 99.8 | 99.9 | 99.9 |
| | 3 hr | 96.7 | 99.9 | 99.9 | 99.9 | 99.9 | 99.9 |
| Reaction temperature (time 1 hr) | 25° C. | 92.2 | 77.4 | 78.6 | 83.1 | 97.2 | 99.6 |
| | 40° C. | 96.1 | 99.9 | 99.8 | 99.8 | 99.8 | 99.9 |
| | 60° C. | 96.4 | 99.9 | 99.9 | 99.8 | 99.9 | 99.9 |

As shown in Table 3, it was confirmed that the metal precipitation was effectively performed only within a reaction time of 1 hour. In the case of Li, the recovery rate was marginally increased. In addition, it was found that the metal precipitation reaction was somewhat insufficient at a reaction temperature of 25° C. When the reaction temperature was above 40° C., the metal recovery rate was high, and most of the reactions were effective.

Experimental Example 4: Valuable Metal Precipitation Separation Efficiency According to Amount of Input of Lithium Carbonate 8.0% by weight of lithium carbonate was added to the mixture of the filtrate of the leachate and the washing solution obtained in Example 1, and a precipitation reaction was performed at a reaction temperature of 60° C. for 1 hour. Next, a solid-liquid separation step and a second washing step were performed to obtain the filtrate, the washing solution, and the precipitate. The precipitation step, the second solid-liquid separation step, and the second washing step were formed in the same manner as in Example 1, except that the amount of input of lithium carbonate was varied to be 7.5% by weight, 9.0% by weight, and 10.0% by weight.

Next, valuable metal content analysis for each of the filtrates obtained by varying the amount of input of lithium carbonate input was performed, and the results are shown in Table 4 below. The valuable metal recovery rate for each amount of input of lithium carbonate was determined, and the results are shown in Table 5 below. For the case where the amount of input of lithium carbonate was added 8.0% by weight, the content of a metal carbonate composite finally obtained was analyzed, and the results are shown in Table 6 below.

TABLE 4

| Input of lithium carbonate (wt. %) | Li (mg/L) | Ni (mg/L) | Co (mg/L) | Mn (mg/L) | Al (mg/L) | Cu (mg/L) |
|---|---|---|---|---|---|---|
| 7.5 | 24152 | 28.1 | 32.7 | 19.0 | 0.2 | 0.4 |
| 8.0 | 24892 | 14.5 | 11.6 | 9.7 | 0.2 | 0.6 |
| 9.0 | 25121 | 6.2 | 5.6 | 5.7 | 0.1 | 0.5 |
| 10.0 | 27350 | 2.8 | 4.0 | 1.8 | 0.1 | 0.5 |

TABLE 5

| Input of lithium carbonate (wt. %) | Li recovery rate (%) | Ni recovery rate (%) | Co recovery rate (%) | Mn recovery rate (%) | Al recovery rate (%) | Cu recovery rate (%) |
|---|---|---|---|---|---|---|
| 7.5 | 97.4 | 99.8 | 99.7 | 99.8 | 99.9 | 99.9 |
| 8.0 | 96.4 | 99.9 | 99.9 | 99.8 | 99.9 | 99.9 |
| 9.0 | 95.2 | 99.9 | 99.9 | 99.9 | 99.9 | 99.9 |
| 10.0 | 91.6 | 99.9 | 99.9 | 99.9 | 99.9 | 99.9 |

TABLE 6

| Input of lithium carbonate (wt. %) | Ni (mg/L) | Co (mg/L) | Mn (mg/L) | Al (mg/L) | Cu (mg/L) |
|---|---|---|---|---|---|
| 8.0 | 158563 | 134264 | 132297 | 39574 | 30235 |

As shown in Tables 4 to 6, as the amount of input of lithium carbonate increased, the content of Li in the precipitation filtrate increased, and the contents of Ni, Co, Mn, Al, and Cu decreased. In addition, when observing the metal recovery rate according to the amount of input of lithium carbonate, when the amount of input of lithium carbonate was 8.0% by weight, 99% of Ni, Co, Mn, Al, and Cu were effectively precipitated in the form of a metal carbonate composite. It was found that Li recovery rate decreased as the amount of input of lithium carbonate increased. This is because the unreacted lithium carbonate is contained in the precipitate residue. Therefore, when lithium carbonate is added in an optimum amount, Li can be recovered at a high recovery rate, and a high-purity aqueous lithium sulfate solution can be obtained as a filtrate. In addition, a metal carbonate composite with high purity can be obtained at a high recovery rate as a precipitate.

As described above, the method of recovering valuable metals from a waste electrode material of a lithium secondary battery by using lithium carbonate, according to the present invention, has an advantage of recovering valuable metals with high purity at high recovery rates from waste an electrode material of a lithium secondary battery by pre-processing the waste electrode material, dissolving the pre-processed waste electrode material with sulfuric acid to obtain a metal melt, and adding an optimum amount of lithium carbonate ($Li_2CO_3$) to the metal melt so that the metals can be precipitated.

Although the present invention has been described with reference to the preferred example, the ordinarily skilled in the art will appreciate that the present invention is not limited to the example described above and can be diversely changed and modified without departing from the scope of the spirit of the present invention.

In the method of recovering valuable metals from a waste electrode material of a lithium secondary battery by using lithium carbonate, according to the present invention, valuable metals such as nickel, cobalt, manganese, aluminum, and copper are recovered as a residue in the form of a carbonate composite, and an aqueous solution of lithium sulfate ($Li_2SO_4$), which contains lithium, is recovered as a filtrate. The recovered valuable metals can be used as raw materials for manufacturing a lithium secondary battery.

What is claimed is:

1. A method of recovering valuable metals by using a waste electrode material, the method comprising:
 a waste electrode material preparation step of preparing a waste electrode material;
 a pre-processing step of thermally processing the waste electrode material in a firing furnace in a temperature range of 300° C. to 500° C. for a duration of 30 minutes to 120 minutes;
 a sulfuric acid dissolution step of, after the pre-processing step, adding sulfuric acid to the waste electrode material so that the waste electrode material reacts with the sulfuric acid;
 a first solid-liquid separation step of separating the resulting product obtained through the sulfuric acid dissolution step into a metal melt and an unreacted residue;
 a precipitation step of mixing lithium carbonate ($Li_2CO_3$) with the metal melt and stirring the resulting mixture; and
 a second solid-liquid separation step of separating the resulting product obtained through the precipitation step into a precipitate and a filtrate,
 wherein an aqueous solution of lithium sulfate is recovered from the filtrate, and nickel carbonate and cobalt carbonate are recovered from the precipitate.

2. The method of claim 1, wherein the sulfuric acid dissolution step is performed by stirring in a temperature range of 60° C. to 100° C. for a duration of 60 minutes to 120 minutes at a stirring speed of 250 rpm to 400 rpm.

3. The method of claim 2, wherein the sulfuric acid dissolution step further comprises adding hydrogen peroxide to the waste electrode material.

4. The method of claim 1, further comprising a first washing step of washing the unreacted residue with water, the first washing step following the first solid-liquid separation step,
 wherein the precipitation step is performed by mixing the lithium carbonate with a mixture containing a washing solution obtained through the first washing step and the metal melt, and then stirring the mixture.

5. The method of claim 1, wherein in the precipitation step, a reaction is performed by stirring in a temperature range of 40° C. to 80° C. for a duration of 60 minutes to 180 minutes at a stirring speed of 250 rpm to 400 rpm.

6. The method of claim 1, further comprising a second washing step of washing the precipitate with water, the second washing step following the second solid-liquid separation step, wherein an aqueous solution of lithium sulfate is recovered from a washing solution obtained through the second washing step.

7. The method of claim 1, wherein the waste electrode material comprises at least one selected from among lithium nickel cobalt aluminum oxide ($LiNiCoAlO_2$, NCA), lithium nickel cobalt manganese oxide ($LiNiCoMnO_2$, NCM), lithium iron oxide ($LiFePO_4$, LFP), lithium manganese iron oxide ($LiMnFePO_4$, LMFP), lithium manganese oxide ($LiMn_2O_4$, LMO), lithium nickel manganese spinel ($LiNi_{0.5}Mn_{1.5}O_4$, LNMO), and lithium cobalt oxide ($LiCoO_2$, LCO).

\* \* \* \* \*